United States Patent
Jung et al.

(10) Patent No.: US 7,999,723 B2
(45) Date of Patent: Aug. 16, 2011

(54) DEVICE AND METHOD FOR DETECTING NON-LINEAR ELECTRONIC COMPONENTS OR CIRCUITS ESPECIALLY OF A BOOBY TRAP OR THE LIKE

(75) Inventors: Markus Jung, Eicklingen (DE); Gerd Wollmann, Celle (DE)

(73) Assignee: Rheinmetall Waffe Munition GmbH, Ratingen (DE)

( * ) Notice: Subject to any disclaimer, the term of this patent is extended or adjusted under 35 U.S.C. 154(b) by 31 days.

(21) Appl. No.: 12/377,747

(22) PCT Filed: Jul. 20, 2007

(86) PCT No.: PCT/EP2007/006461
§ 371 (c)(1),
(2), (4) Date: Feb. 17, 2009

(87) PCT Pub. No.: WO2008/019750
PCT Pub. Date: Feb. 21, 2008

(65) Prior Publication Data
US 2010/0182189 A1    Jul. 22, 2010

(30) Foreign Application Priority Data
Aug. 17, 2006 (DE) .......................... 10 2006 038 627

(51) Int. Cl.
*G01S 13/00*   (2006.01)
*G01S 7/42*    (2006.01)
*G08B 13/14*   (2006.01)

(52) U.S. Cl. .......................... 342/22; 342/13; 340/572.2

(58) Field of Classification Search .............. 342/13–20, 342/22, 128, 129, 175; 340/572.2
See application file for complete search history.

(56) References Cited

U.S. PATENT DOCUMENTS

| 3,028,596 | A | * | 4/1962 | McGillen et al. | ............. 342/351 |
| 3,599,211 | A | * | 8/1971 | Mardon | ........................ 342/351 |
| 3,631,484 | A | * | 12/1971 | Augenblick | .................... 342/46 |
| 3,732,567 | A | * | 5/1973 | Low et al. | ..................... 342/128 |
| 3,911,435 | A | * | 10/1975 | Mardon et al. | ................ 342/351 |
| 4,035,797 | A | * | 7/1977 | Nagy | ............................. 342/104 |

(Continued)

FOREIGN PATENT DOCUMENTS

GB        2 381 077        4/2003

(Continued)

OTHER PUBLICATIONS

Thomas H. Jones: "An overview of non-linear junction detection technology for countersurveillance" [online] Feb. 1999, pp. 1-9, XP002502156 Retrieved from the Internet: http://www.reiusa.net/system/products/NJE-4000/NLJDTech.pdf [retrieved on Oct. 31, 2008] the whole document.

*Primary Examiner* — Thomas H Tarcza
*Assistant Examiner* — Peter Bythrow
(74) *Attorney, Agent, or Firm* — Lucas & Mercanti, LLP; Klaus P. Stoffel

(57) ABSTRACT

The invention relates to a device and a method wherein tunable transmitters and detectors (receivers) are integrated into a non-linear detection system and a narrow-band signal having a variable frequency is used. The scanable frequency range should be between 10-100 MHz. The frequency acceptance range for the second and third harmonic is adjusted according to the transmit frequency.

5 Claims, 1 Drawing Sheet

U.S. PATENT DOCUMENTS

| | | | | |
|---|---|---|---|---|
| 4,053,891 A * | 10/1977 | Opitz | | 342/193 |
| 4,303,910 A * | 12/1981 | McCann | | 340/572.2 |
| 5,177,445 A * | 1/1993 | Cross | | 324/637 |
| 5,191,343 A * | 3/1993 | Danzer et al. | | 342/21 |
| 5,227,800 A * | 7/1993 | Huguenin et al. | | 342/179 |
| 5,381,153 A * | 1/1995 | Saito et al. | | 342/70 |
| 5,552,705 A * | 9/1996 | Keller | | 324/239 |
| 6,049,301 A * | 4/2000 | Weagant | | 342/13 |
| 6,057,765 A * | 5/2000 | Jones et al. | | 340/572.2 |
| 6,163,259 A * | 12/2000 | Barsumian et al. | | 340/572.2 |
| 6,243,036 B1 * | 6/2001 | Chadwick et al. | | 342/27 |
| 6,359,582 B1 * | 3/2002 | MacAleese et al. | | 342/22 |
| 6,480,141 B1 * | 11/2002 | Toth et al. | | 342/22 |
| 6,765,527 B2 * | 7/2004 | Jablonski et al. | | 342/193 |
| 6,864,825 B2 * | 3/2005 | Holly | | 342/13 |
| 6,897,777 B2 * | 5/2005 | Holmes et al. | | 340/572.2 |
| 6,933,878 B1 * | 8/2005 | Molyneux-Berry | | 342/16 |
| 6,967,612 B1 * | 11/2005 | Gorman et al. | | 342/22 |
| 6,999,041 B2 * | 2/2006 | Holly | | 343/820 |
| 7,142,147 B2 * | 11/2006 | Holly | | 342/13 |
| 7,162,285 B2 * | 1/2007 | Owens et al. | | 455/575.5 |
| 7,167,123 B2 * | 1/2007 | Hausner et al. | | 342/22 |
| 7,183,964 B2 * | 2/2007 | Steinway et al. | | 342/22 |
| 7,391,356 B2 * | 6/2008 | Brumley et al. | | 342/13 |
| 7,450,052 B2 * | 11/2008 | Hausner et al. | | 342/22 |
| 7,512,511 B1 * | 3/2009 | Schultz et al. | | 702/127 |
| 7,639,178 B1 * | 12/2009 | Mulbrook et al. | | 342/146 |
| 2003/0034444 A1 * | 2/2003 | Chadwick et al. | | 250/225 |
| 2003/0179126 A1 * | 9/2003 | Jablonski et al. | | 342/22 |
| 2004/0041724 A1 * | 3/2004 | Levitan et al. | | 342/22 |
| 2004/0095243 A1 * | 5/2004 | Holmes et al. | | 340/572.2 |
| 2005/0064922 A1 * | 3/2005 | Owens et al. | | 455/575.5 |
| 2005/0179612 A1 * | 8/2005 | Holly et al. | | 343/853 |
| 2006/0082488 A1 * | 4/2006 | Keller | | 342/22 |
| 2007/0013577 A1 * | 1/2007 | Schnitzer et al. | | 342/90 |
| 2007/0063886 A1 * | 3/2007 | Brumley et al. | | 342/13 |
| 2008/0254738 A1 * | 10/2008 | Brumley et al. | | 455/1 |
| 2010/0182189 A1 * | 7/2010 | Jung et al. | | 342/22 |

FOREIGN PATENT DOCUMENTS

| | | | |
|---|---|---|---|
| GB | 2381077 A * | 4/2003 | |
| WO | 02065419 | 8/2002 | |
| WO | 2004038455 | 5/2004 | |

* cited by examiner

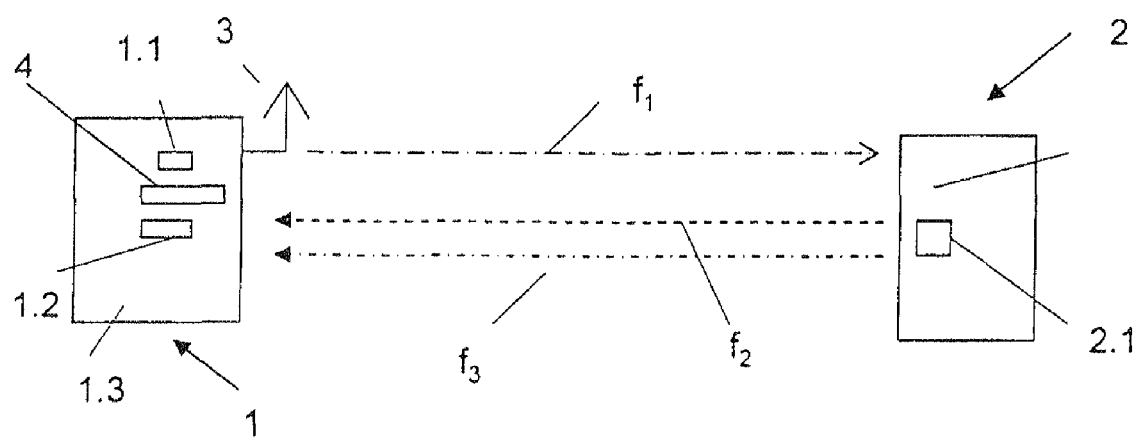

DEVICE AND METHOD FOR DETECTING NON-LINEAR ELECTRONIC COMPONENTS OR CIRCUITS ESPECIALLY OF A BOOBY TRAP OR THE LIKE

BACKGROUND OF THE INVENTION

The invention concerns a device and a method for detecting nonlinear electronic components or electronic circuits, especially for detecting the electronics of an improvised explosive device (IED).

A well-known method for detecting nonlinear components is nonlinear junction detection (NLJD). This method has the ability to detect electronic circuits built with semiconductor components. As a result of the nonlinear behavior, signals of a fixed frequency coupled into the circuit are converted to signals with a multiple of the emitted frequency and are reemitted. A method of this type and a corresponding nonlinear junction detector are described in detail in U.S. Pat. No. 6,163,259 A. Another nonlinear junction detector is disclosed by WO 02/065419 A1. Another patent, WO 2004/038455 A1, concerns a method and a device for detecting eavesdropping devices. In principle, the method works by evaluating a second and a third harmonic primary frequency reflected at the target. Information about the presence or absence of an electronic circuit is then derived from these two harmonics.

IED's are devices or explosive booby traps that usually consist of four major groups of components: a trigger, explosives, alone or combined with poisonous chemicals, toxic biological materials or radiological material, and an effector. The trigger can be mechanical or electronic in nature.

To avoid danger, it is necessary to know whether an IED is present, where it is located, when a detonation of this IED is to be feared, and how much and what type of explosive it contains. Other information it would be important to know is whether biological or radioactive materials are present in the IED. In this connection, the explosive can be detected, for example, by known laser technologies or x-rays, and information about the biological content can be obtained, for example, by the use of biosensors. If the IED's additionally contain an electronic system, e.g., an electronic ignition circuit, a search can also be made for the presence of these electronics, for example, by means of the aforementioned NLJD.

The detection range of a target (for example, an IED) depends to a great extent on the signal-to-noise ratio of the harmonic frequencies. In practical investigations, it was determined that there is a difference in detection distance by a factor of almost 8 to 12 between simple circuits and circuits with high-grade shielding. This corresponds to a factor of 4,000-20,000 for the received signal lines.

Due to the signal-to-noise ratio of the amplifier connected on the load side and possible modulation processes, there is a minimum received power at the receiver that is necessary for detection.

With respect to the transmitting power, there are both CW systems (continuous-wave systems) and pulsed systems for manual operation. However, where manual operation is concerned, the transmitting power is limited by values based on personal protection criteria.

SUMMARY OF THE INVENTION

The objective of the invention is to specify a method with which the present range of a nonlinear junction detector can be significantly increased.

Previously known NLJD systems operate at a fixed frequency. If this frequency does not coincide with one of the so-called transmission windows of the target, as is often the case, it can happen that, although the signal of the transmitter enters the closed system (target), the detector can recognize neither the second nor the third harmonic frequency, because the closed system just does not have a transmission window in this frequency response. The transmission signal often has not even reached the electronics in the first place.

Therefore, the invention is based on the idea of integrating tunable transmitters and detectors (receivers) in the nonlinear detection systems and of using a narrow-band, variable-frequency signal. In this regard, the scannable frequency range should be 10-1,000 MHz. The receiving frequency for the second and third harmonics is readjusted according to the transmitting frequency.

The goal of the tuning of the transmitter is to reduce the attenuation losses (during the coupling into the case and coupling out of the case of the closed system—the target) and the coupling losses (coupling factor between the power coupled in at the frequency and the power that is transformed into the harmonic frequency). The coupling frequency at which the two harmonics are most strongly reflected again then represents the optimal frequency. If the target is a radio set, the receiving gain of the target can additionally be used if the transmission frequency lies within the receiving bandwidth of the target.

All electronic systems as well as electronically triggered IED's exhibit the phenomenon of being able to communicate with the environment only through a type of holes/open doors. With tunable transmitters/receivers, it now becomes possible to find the frequency holes of a target, especially a shielded target.

The new method now also makes it possible to determine the local position of the target (IED) in a simple way. In addition, the detection distance is significantly greater than that of existing devices.

Another advantage of this solution is that in environments in which devices with different frequencies are present, these frequencies are not considered for detection but rather are excluded during the scanning of the frequency. This also minimizes the error rate.

The invention will now be explained in greater detail with reference to the specific embodiment of the invention illustrated in the drawing.

BRIEF DESCRIPTION OF THE DRAWING

The single FIGURE is a schematic representation of the invention.

DETAILED DESCRIPTION OF THE INVENTION

The sole FIGURE shows a nonlinear junction detector 1 for detecting the electronics 2.1 of a target 2. The nonlinear junction detector 1 consists of at least one transmitter 1.1 and at least one receiver 1.2, which, in a preferred design, are installed in a housing 1.3. Separate arrangements of transmitters 1.1 and receivers 1.2 are also possible.

The nonlinear junction detector 1 has at least one antenna 3, by which a narrow-band signal $f_1$ can be emitted within a broadband of several 100 MHz. This one antenna 3 is a broadband antenna that is capable of transmitting and receiving in both polarizations (circularly polarized). The use of two orthogonally arranged antennas (not shown) is also possible, one for transmitting and the other for receiving.

Corresponding to the emitted frequency $f_1$, only signals of the frequencies $f_2=2*f_1$ and $f_3=3*f_1$ are received in the receiving range of the receiver/detector 1.2 and evaluated. In this regard, the frequency $f_1$ can be varied by an electronic unit 4 both linearly and in specific steps. This variation is continued until an optimal transmission frequency $f_1$ has been established. (This can be recognized from the fact that the two harmonics also reach the receiver 1.2 again with a maximum signal strength. In this regard, it can be assumed that the optimal transmission frequency $f_1$ as well as the harmonics coincide with the so-called transmission windows of the target 2 and represent the receiving bandwidth of the target.) The target 2 is then irradiated with this optimal or optimized frequency $f_1$, and the presence of nonlinear circuits or components in the target 2 can be concluded from the transformed response in the receiver/detector 1.2. This optimized frequency $f_1$ allows a greater distance between the junction detector 1 and the target 2.

In cases in which the input amplification of the target 2 is used, it is advisable to select a frequency that is typical for the communication of these targets 2.

The invention claimed is:

1. A device for detecting nonlinear electronic components or circuits of a target, comprising: a junction detector with at least one transmitter and one receiver and at least one antenna, by which a signal with a frequency ($f_1$) is emitted, which signal is coupled into the nonlinear circuit and converted to signals with frequencies ($f_2$, $f_3$) that are multiples of the emitted frequency ($f_1$), which are radiated to the receiver and received by the at least one antenna: and a device integrated in the junction detector, by which the frequency ($f_1$) of the narrow-band signal is varied within a predeterminable bandwidth of 10-1,000 MHz, so that a minimal value is obtained for a sum of the attenuation and coupling losses at an optimal coupled signal, wherein the received frequency for second and third harmonics is readjusted according to the emitted frequency.

2. The device in accordance with claim 1, wherein the antenna is a broadband antenna that can transmit and receive in both polarizations.

3. The device in accordance with claim 1, wherein one broadband antenna for transmitting and another broadband antenna for receiving are provided.

4. A method for detecting nonlinear electronic components or circuits of a target, which device has a junction detector with at least one transmitter and one receiver and at least one antenna, the method comprising the steps of: emitting a signal with a frequency ($f_1$), which signal is coupled into the nonlinear circuit and converted to signals with frequencies ($f_2$, $f_3$) that are multiples of the emitted frequency ($f_1$); radiating the signals to the receiver, which signals are received by the at least one antenna; and varying the frequency ($f_1$) of the narrow-band signal within a predeterminable bandwidth of 10-1,000 MHz, so that a minimal value is obtained for a sum of the attenuation and coupling losses at an optimal coupled signal, and readjusting the received frequency for second and third harmonics according to the emitted frequency.

5. The method in accordance with claim 4, including varying the frequency ($f_1$) both linearly and in specific steps.

* * * * *